United States Patent
Tanaka et al.

(10) Patent No.: US 9,319,860 B2
(45) Date of Patent: Apr. 19, 2016

(54) MOBILE TERMINAL THAT DETERMINE WHETHER THE USER IS WALKING WHILE WATCHING THE MOBILE TERMINAL

(71) Applicant: FUJITSU TEN LIMITED, Kobe-shi, Hyogo (JP)

(72) Inventors: Shinichi Tanaka, Kobe (JP); Hironori Ichioka, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 35 days.

(21) Appl. No.: 14/278,614

(22) Filed: May 15, 2014

(65) Prior Publication Data

US 2014/0357213 A1 Dec. 4, 2014

(30) Foreign Application Priority Data

May 29, 2013 (JP) ................... 2013-112651

(51) Int. Cl.
*H04M 11/04* (2006.01)
*H04W 24/00* (2009.01)
*H04W 4/22* (2009.01)
*H04W 4/02* (2009.01)

(52) U.S. Cl.
CPC ............. *H04W 4/22* (2013.01); *H04W 4/027* (2013.01)

(58) Field of Classification Search
CPC ........ H04W 4/025; H04W 4/027; H04W 4/22
USPC .......................................... 455/404.1, 456.1
See application file for complete search history.

(56) References Cited

U.S. PATENT DOCUMENTS

| 7,972,246 B2 * | 7/2011 | Shinomiya | A61B 5/1038 482/1 |
| 8,077,915 B2 * | 12/2011 | Thorn | G06Q 10/02 382/103 |
| 2009/0097705 A1 * | 4/2009 | Thorn | G06Q 10/02 382/103 |
| 2013/0115974 A1 * | 5/2013 | Lee | H04W 4/025 455/456.5 |
| 2014/0357213 A1 * | 12/2014 | Tanaka | H04W 4/22 455/404.1 |
| 2015/0141043 A1 * | 5/2015 | Abramson | G01C 21/3697 455/456.1 |

FOREIGN PATENT DOCUMENTS

| JP | A-2009-267644 | 11/2009 |
| JP | A-2013-032932 | 2/2013 |
| WO | WO 2013/144380 A2 * | 10/2013 |
| WO | WO 2015/164584 A1 * | 10/2015 |

OTHER PUBLICATIONS

"Method and Apparatus for Proximity Alerting on Mobile Devices," IP.com Disclosure No. IPCOM000225731D, Mar. 1, 2013.*

* cited by examiner

*Primary Examiner* — William D Cumming
(74) *Attorney, Agent, or Firm* — Oliff PLC

(57) ABSTRACT

A mobile terminal includes a display screen, a first camera that is installed on a side of the mobile terminal having the display screen, a velocity sensor that derives moving velocity of the mobile terminal, and a controller configured to (i) determine a starting state of the display screen, (ii) determine a direction of a face of a user based on a shot image obtained from the first camera, and (iii) determine whether the user is walking while watching the mobile terminal based on the moving velocity, the starting state and the direction of the face of the user.

17 Claims, 13 Drawing Sheets

MOBILE TERMINAL THAT DETERMINE WHETHER THE USER IS WALKING WHILE WATCHING THE MOBILE TERMINAL

BACKGROUND OF THE INVENTION

1. Field of the Invention

The invention relates to a technology that performs notification of danger by use of a mobile terminal.

2. Description of the Background Art

These days, the number of traffic accidents of pedestrians walking while using mobile devices (e.g., mobile phone, smartphone) is increasing. A user who is walking while watching a mobile device rarely turns his or her visual line toward surroundings, which is a cause of an accident with a vehicle, an obstacle or the like. As vehicles excellent in silence such as hybrid cars and electrical cars increase, more pedestrians are in danger of having accidents with these vehicles. In this regard, a technology that automatically prevents the user watching the screen of a mobile terminal from having an accident or being in danger is known.

However, the conventional technology that automatically prevents a user from having accidents or being in danger changes the operation status of a running application in accordance with the relation between the application and user's status without determining whether the user actually may have an accident or is in danger. Thus, the technology occasionally suppresses user's usage of a mobile terminal even in the case where the user is not in danger. Because of this, the technology is low in convenience for a user.

SUMMARY OF THE INVENTION

According to one aspect of the invention, a mobile terminal includes a display screen, a first camera that is installed on a side of the mobile terminal having the display screen, a velocity sensor that derives moving velocity of the mobile terminal, and a controller configured to (i) determine a starting state of the display screen, (ii) determine a direction of a face of a user based on a shot image obtained from the first camera, and (iii) determine whether the user is walking while watching the mobile terminal based on the moving velocity, the starting state and the direction of the face of the user.

This can surely determine that the user is walking while watching the mobile terminal and is in danger, and can notify the user of being danger, if applicable.

According to another aspect of the invention, a danger notifying system notifies a driver of a vehicle that a user of a mobile terminal is in danger, and includes the mobile terminal and the vehicle. On the danger notifying system, the mobile terminal has a controller that determines (i) whether the user is walking while watching the mobile terminal and (ii) whether the user is in danger when the user is walking while watching the mobile terminal, a location information receiver that obtains location information of the mobile terminal, and a transmitter that transmits the location information of the mobile terminal to the vehicle when the user is in danger. In addition, the vehicle has a display that displays the location information obtained from the mobile terminal.

This can notify the driver of the vehicle that a pedestrian in danger exists in the periphery, if any.

Therefore, the object of the invention is to provide the technology that can accurately determine user's status, and can notify the user in danger when the user is in danger.

These and other objects, features, aspects and advantages of the invention will become more apparent from the following detailed description of the invention when taken in conjunction with the accompanying drawings.

DESCRIPTION OF THE EMBODIMENTS

Hereinafter, some embodiments of the invention are described with reference to drawings.

1. First Embodiment

<1-1. System Outline>

Figure 1:
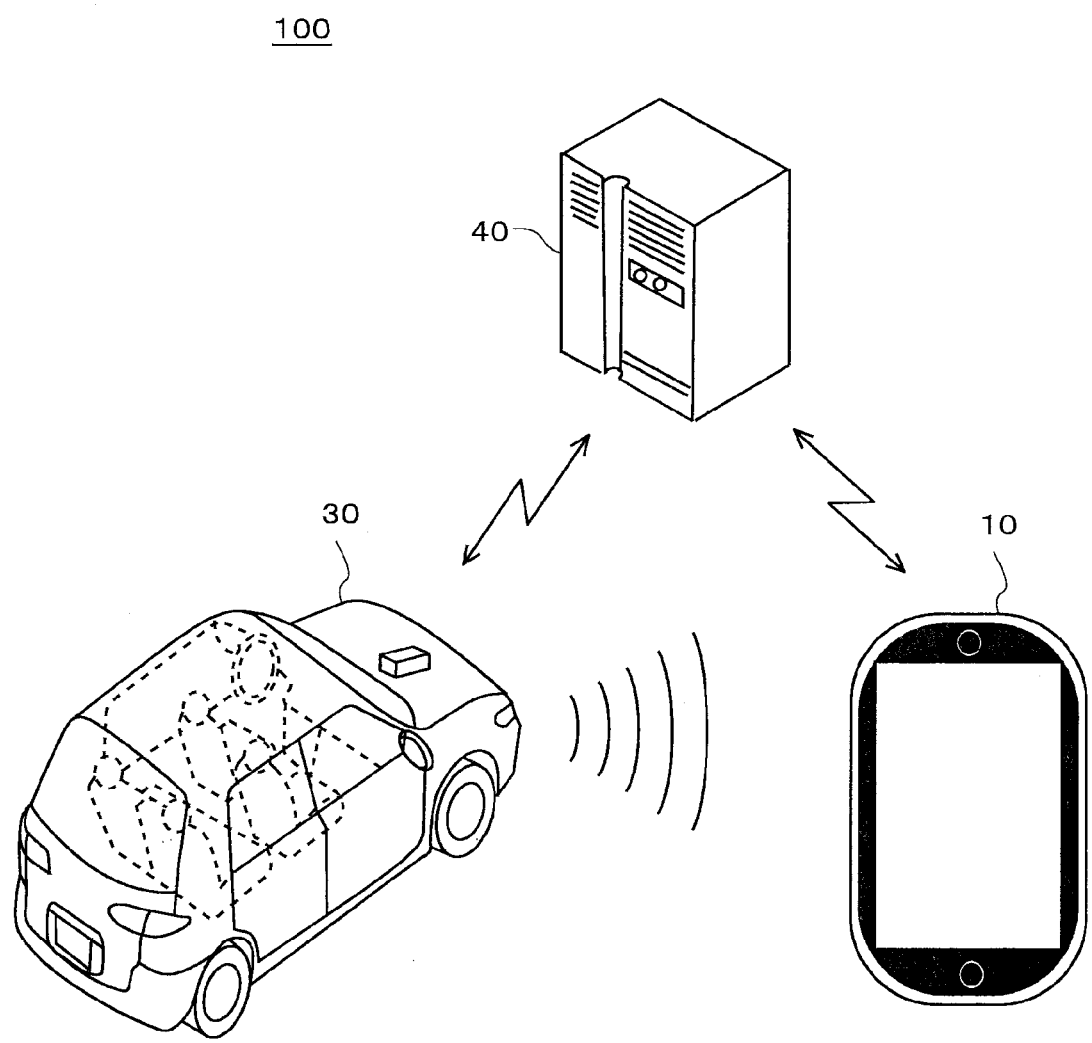
FIG. 1 shows a schematic configuration of a danger notifying system.

FIG. 1 shows a schematic configuration of a danger notifying system 100 of the embodiment. The danger notifying system 100 has a mobile terminal 10, a vehicle 30 and a center 40.

The mobile terminal 10 is a mobile electronic device carried by a user, for example, a smartphone, a tablet, a mobile phone and PDA (Personal Digital Assistant). The mobile terminal 10 has a function for notifying the user that the user is in danger in the case where the user is in danger of having an accident or others. The mobile terminal 10 determines whether the user is in danger or not, in consideration of user's status and surroundings. When determining that the user is in danger, the mobile terminal 10 notifies the user of details in accordance with the degree of danger. The mobile terminal 10 is constituted so as to be communicable with the center 40, and transmits location information or others of the mobile terminal 10 that is in danger.

The vehicle 30 is a vehicle, for example a car, running in the periphery of the user. The vehicle 30 outputs ultrasonic waves having a prescribed frequency to notify the mobile terminal 10 in the periphery of the existence of the vehicle. The vehicle 30 is constituted so as to be communicable with the center 40. When receiving from the center 40 the location information of the mobile terminal 10 that is in danger, the vehicle 30 displays the contents of the received information on a display.

The center 40 is an information processor that is constituted so as to be communicable with the mobile terminal 10 and the vehicle 30. When receiving the location information from the mobile terminal 10 that is in danger, the center 40 transmits the information to the vehicle 30.

As above, the mobile terminal 10 of the embodiment determines whether the user is in danger or not, in consideration of the status of the user using the mobile terminal 10 and the status of the vehicle 30 running in the periphery of the user. Then, the mobile terminal 10, when determining that the user is in danger, notifies the user of the determination result. In addition, the danger notifying system 100 is capable of notifying the vehicle 30 of the existence of the mobile terminal 10 that is in danger. Hereinafter, respective configurations and processing of the danger notifying system 100 are detailed.

<1-2. Configuration of Mobile Terminal>

Figure 2:
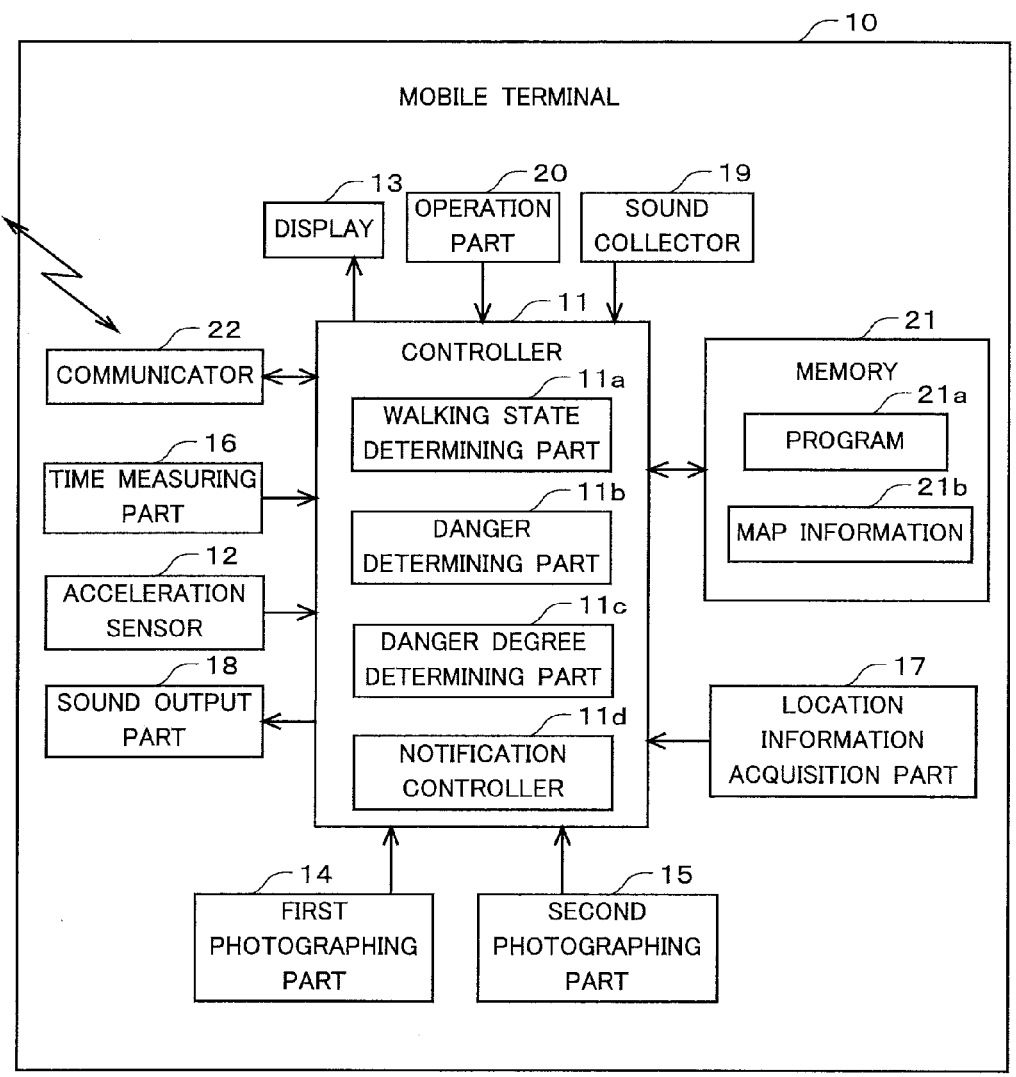
FIG. 2 shows a configuration block diagram of a mobile terminal.

First, the configuration of the mobile terminal 10 is described. FIG. 2 shows a schematic block diagram of the mobile terminal 10. As shown in FIG. 2, the mobile terminal 10 has a controller 11, an acceleration sensor 12, a display 13, a first photographing part 14, a second photographing part 15, a time measuring part 16, a location information acquisition part 17, a sound output part 18, a sound collector 19, an operation part 20, a memory 21, and a communicator 22.

Further, the controller 11 is a computer having a walking state determining part 11a, a danger determining part 11b, a danger degree determining part 11c and a notification controller 11d, and also having a CPU, RAM and ROM not shown in the figure. The controller 11 that is connected to the memory 21 and others included in the mobile terminal 10 controls the entire mobile terminal 10 based on a program 21a stored in the memory 21. Execution of arithmetic processing by the CPU based on the program 21a stored in the memory 21 provides various functions of the controller 11.

The walking state determining part 11a determines whether the user is walking while watching the mobile terminal 10. In this specification, user's act of walking while watching the mobile terminal 10 is called "while-watching walking." That is, the walking state determining part 11a determines whether the user is in the state of "while-watching walking" or not. The walking state determining part 11a determines whether the user is in the "while-watching walking" state based on moving velocity of the mobile terminal 10 (that is user's moving velocity), a starting state (on or off of a screen) of the display 13 and others.

When the user is in the "while-watching walking" state, the danger determining part 11b determines whether the user is in danger of having a contact accident with a car or the like. The danger determining part 11b obtains the information of the vehicles and the like running in the periphery of the point of the user being in the "while-watching walking" state, and determines whether the user is in danger based on the information.

The danger degree determining part 11c determines user's danger degree when the user is in danger. Even the user is in danger, user's danger degree may vary in accordance with user's use status on the mobile terminal 10. Thus, the danger degree determining part 11c determines user's danger degree from plural danger levels in consideration of the information.

The notification controller 11d notifies, when the user is in danger, the user that he or she is in danger. The notification controller 11d notifies the user that he or she is in danger, by displaying such a message on the display 13 or outputting such message sound through the sound output part 18. The notification controller 11d selects an applicable message or sound for notification out of plural types of messages and sounds in accordance with the danger degree.

The acceleration sensor 12 derives acceleration while the mobile terminal 10 moves. In the embodiment, the acceleration sensor 12 that may be a two-axial acceleration sensor or a three-axial acceleration sensor integrates the acceleration in a horizontal direction to derive the moving velocity of the mobile terminal 10 (that is user's moving velocity).

The display 13 is displaying apparatus installed in the mobile terminal 10, for example, a liquid crystal display or an organic EL display.

Each of the first photographing part 14 (the first camera) and the second photographing part 15 (the second camera) which is constituted with a camera including a lens and an imaging device, electronically obtains images where the periphery of the mobile terminal 10 is photographed. The first photographing part 14 is installed on the side of the display 13 of the mobile terminal 10 to capture the peripheral images of the side of the display 13. The second photographing part 15 is installed on the opposite side to the display 13 of the mobile terminal 10 to capture the peripheral images of the opposite side to the display 13. That is, the first photographing part 14 is a so-called inward camera to capture user's side in a normal use. The second photographing part 15 is a so-called outward camera to capture the opposite side to the user in a normal use.

The time measuring part 16 measures time, for example, the time during which the user is watching the display 13 so as to use the time for determining whether the user is in the "while-watching walking" state.

The location information acquisition part 17 obtains the location information of the mobile terminal 10. The location information acquisition part 17 may use, for example, GPS (Global positioning system). The location information of the mobile terminal 10 obtained by the location information acquisition part 17 includes latitude information and longitude information. That is, the location information acquisition part 17 obtains the latitude information and the longitude information of the current location of the mobile terminal 10 by use of GPS.

The sound output part 18 is the part that outputs music and voices when playing music and videos on the mobile terminal 10, for example, a speaker or an earphone output part.

The sound collection part 19 is the part that collects exterior sound for input to the mobile terminal 10, for example, a microphone. The sound collector 19 of the embodiment is constituted so as to be able to collect not only the sound having frequencies in an audible range but the sound in an inaudible range such as ultrasonic waves.

The operation part 20 is input apparatus equipped with a touch panel. The user can carry out various operations on the mobile terminal 10 by operating the operation part 20.

The memory 21 stores the program 21a and map information 21b. The memory 21 of the embodiment is nonvolatile semiconductor memory where data reading and writing are electrically available and that is capable of keeping data even in a power-off state. For example, EEPROM (Electrical Erasable Programmable Read-Only memory) or a flash memory may be used as the memory 21. However other memory media or a hard disk drive including a magnetic disk may be also used.

The program 21a is so-called system software that is read out by the controller 11 for execution to control the mobile terminal 10. The map information 21b includes road information around the country or of a predetermined wide area.

The communicator 22 is constituted so as to be able to communicate with the center 40 for exchanging information with the center 40. In an example, the communicator 22 transmits to the center 40 the location information of the mobile terminal 10 that is in danger. Communication between the mobile terminal 10 and the center 40 is through a so-called mobile telephone network, or Internet line.

<1-3. Configuration of Vehicle>

Figure 3:
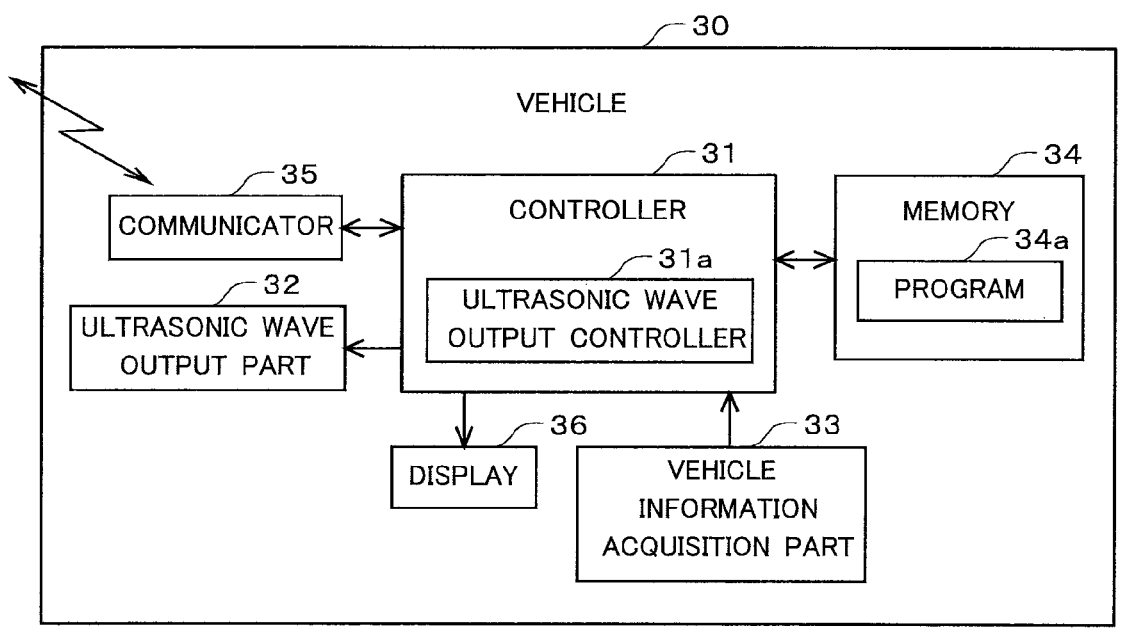
FIG. 3 shows a configuration block diagram of a vehicle.

Next, the configuration of the vehicle 30 is described. FIG. 3 shows a schematic block diagram of the vehicle 30. As shown in FIG. 3, the vehicle 30 has a controller 31, an ultrasonic wave output part 32, a vehicle information acquisition part 33, a memory 34, a communicator 35 and a display 36.

The controller 31 that includes an ultrasonic wave output controller 31a is a computer that has a CPU, RAM and ROM not shown in the figure. The controller 31 that is connected to the memory 34 and others controls the entire vehicle 30 based on a program 34a that is stored in the memory 34. Execution of arithmetic processing by the CPU based on the program 34a stored in the memory 34 provides various functions of the controller 31.

The ultrasonic wave output controller 31a controls the ultrasonic waves having a prescribed frequency that are to be output outside the vehicle 30 through the ultrasonic wave output part 32 to be described later.

The controller 31 is connected so as to be able to communicate to other various sensors and ECUs (Electronic Control Units) installed in the vehicle via an on-vehicle LAN (Local Area Network) such as a CAN (Controller Area Network) for exchanging various types of information with these sensors and ECUs.

The ultrasonic wave output part 32 outputs ultrasonic waves having a prescribed frequency so as to notify its surroundings that the vehicle exists. The ultrasonic waves output by the ultrasonic wave output part 32 have a frequency collectable by the sound collector 19. Thus, the mobile terminal 10 can detect that a vehicle exists in the periphery or is approaching by obtaining the ultrasonic waves output by the ultrasonic wave output part 32.

The vehicle information acquisition part 33 obtains vehicle information as the information indicating the running conditions of the vehicle and the conditions of other ECUs. A vehicle is equipped with: sensors to detect running vehicle conditions, such as a vehicle velocity sensor and a steering angle sensor; engine-control-type ECUs such as a fuel injection ECU; and body-control-type ECUs such as a door-lock/-unlock ECU. The vehicle information acquisition part 33 obtains the output by these sensors and ECUs via CAN as vehicle information.

The memory 34 stores the program 34a. The memory 34 of the embodiment is nonvolatile semiconductor memory where data reading and writing are electrically available and that is capable of keeping data even in a power-off state. For example, EEPROM or a flash memory may be used as the memory 34. However, other memory media or a hard disk drive including a magnetic disk may be also used. The program 34a is so-called system software that is read out for execution to control the vehicle 30.

The communicator 35 is constituted so as to be able to communicate with the center 40 for exchanging information with the center 40. In an example, the communicator 35 receives from the center 40 the location information of the mobile terminal 10 that is in danger. Communication between the vehicle 30 and the center 40 may be through a so-called mobile telephone network or Internet line.

The display 36 is displaying apparatus installed in the vehicle 30, for example, a liquid crystal display and an organic EL display. The display 36 displays the location information of the mobile terminal 10 that is in danger, which has been obtained from the center 40.

<1-4. Configuration of Center>

Figure 4:
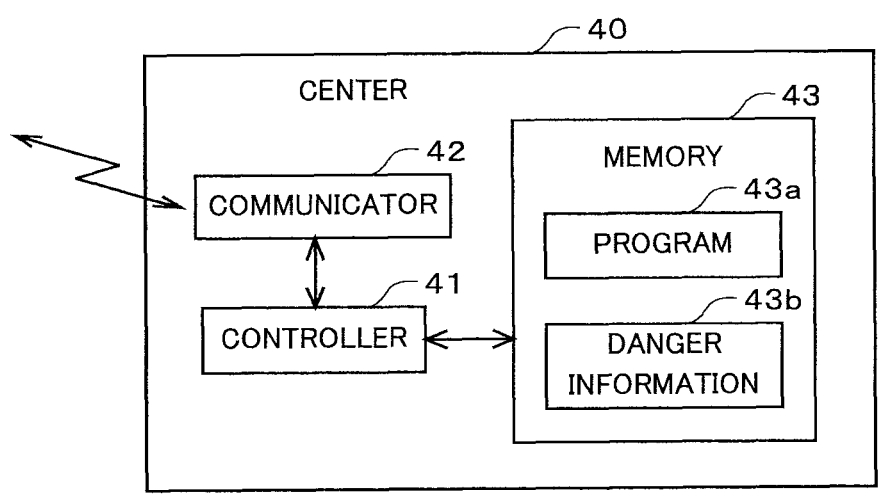
FIG. 4 shows a configuration block diagram of a center.

Next, the configuration of the center 40 is described. FIG. 4 shows a schematic block diagram of the center 40. As shown in FIG. 4, the center 40 has a controller 41, a communicator 42 and a memory 43.

The controller 41 is a computer that has a CPU, RAM and ROM not shown in the figure. The controller 41 that is connected to the memory 43 and others included in the center 40 controls the entire center 40 based on a program 43a stored in the memory 43. Execution of arithmetic processing by the CPU based on the program 43a stored in the memory 43 provides various functions of the controller 41.

The communicator 42 is constituted so as to be able to communicate with the mobile terminal 10 and with the vehicle 30 for exchanging information with them respectively. In an example, the communicator 42 receives the location information of the mobile terminal 10 that is in danger from the mobile terminal 10, and then transmits the received location information to the vehicle 30. Communication between the mobile terminal 10 and the center 40 and between the vehicle 30 and the center 40 is through a so-called mobile telephone network or Internet line.

The memory 43 stores the program 43a and danger information 43b. The memory 43 is nonvolatile semiconductor memory where data reading and writing are electrically available and that is capable of keeping data even in a power-off state. For example, EEPROM or a flash memory may be used as the memory 43. However, other memory media or a hard disk drive including a magnetic disk may be also used.

The program 43a is so-called system software that is read out by the controller 41 for execution to control the center 40. The danger information 43b includes the location information of the mobile terminal 10 that is in danger, which has been obtained from the mobile terminal 10.

<1-5. Processing on Mobile Terminal>

Next, processing on the mobile terminal 10 is described. Each of FIG. 5, FIG. 6, FIG. 7, FIG. 8 and FIG. 9 shows processing on the mobile terminal 10.

Figure 5:
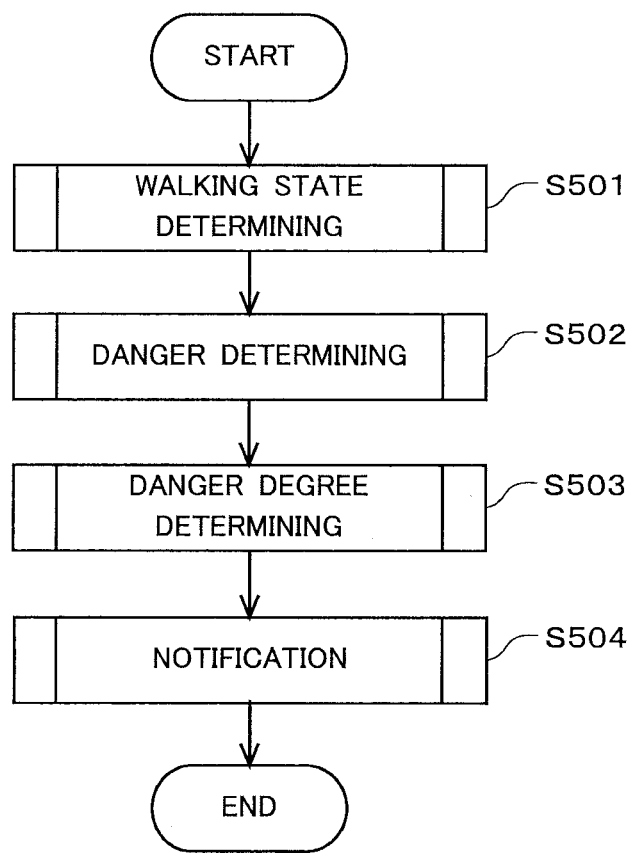
FIG. 5 shows a flowchart of danger notifying processing.

FIG. 5 shows an outlined flowchart of danger notifying processing executed by the mobile terminal 10. As shown in FIG. 5, the mobile terminal 10 first executes walking state determining processing (step S501). That is, the mobile terminal 10 detects user's status and use status on the mobile terminal 10, and determines whether the user is walking while watching the mobile terminal 10 (in the while-watching walking state).

When determining that the user is in the while-watching walking state, the mobile terminal 10 executes danger determining processing (step S502). Even when the user is walking while watching the mobile terminal 10, in some case of user's surroundings the user is not in danger. Thus, the mobile terminal 10 determines whether the user is in danger where the user may have an accident or the like.

When determining that the user is in danger, the mobile terminal 10 executes danger degree determining processing (step S503). That is, when determining that the user is in danger, the mobile terminal 10 determines a danger degree (level of danger) in accordance with a situation. The purpose of this processing is to change a notifying method to the user in accordance with the danger degree: high or low. The danger degree is determined in consideration of the relationship between the user and a vehicle, use status on the mobile terminal 10 and others.

After determining the danger degree, the mobile terminal 10 executes notification processing (step S504). That is, the mobile terminal 10 notifies the user that the user is in danger. The method and details of the notification vary in accordance with the danger degree. In an example, a message giving notification of danger is displayed in a small size on an upper part of a screen, displayed in a large size on the middle of a screen, or output by voice. Moreover, these may be combined.

Next, each processing (step S501 to step S504) in the danger notifying processing described so far is detailed.

Figure 6:
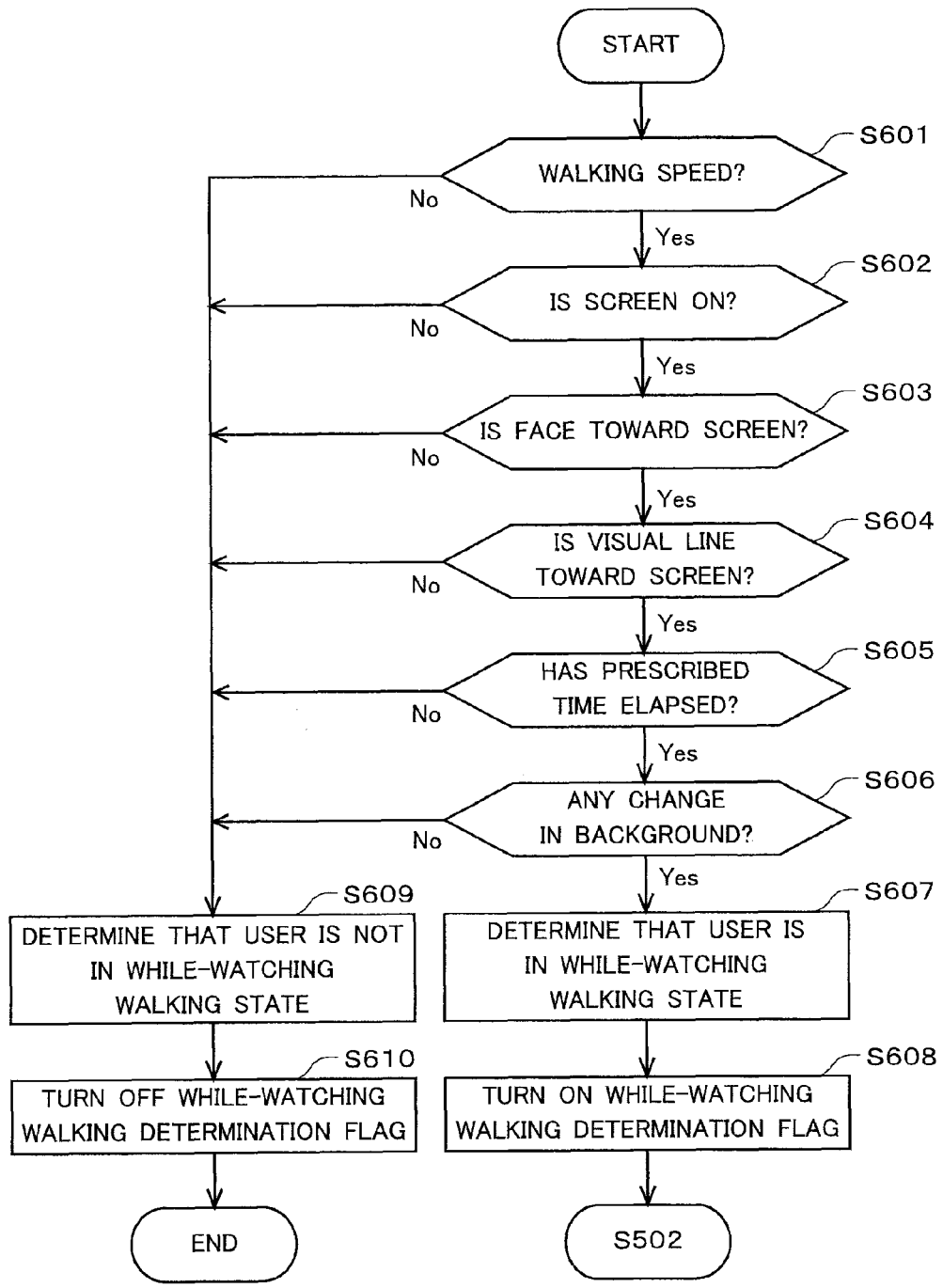
FIG. 6 shows a flowchart of walking state determining processing.

FIG. 6 shows a flowchart of the walking state determining processing (step S501). The walking state determining processing starts when the mobile terminal 10 is activated. However, the processing may start when a screen is lit on (when a screen is turned on). As shown in FIG. 6, when the walking state determining processing starts, the mobile terminal 10 first determines whether user's moving velocity substantially corresponds to a human walking speed (step S601).

Concretely, the walking state determining part 11a first periodically obtains output values from the acceleration sensor 12, and derives the moving velocity of the mobile terminal 10 based on the obtained acceleration. Since the acceleration sensor 12 is a two-axial sensor or a three-axial acceleration sensor as described above, the output acceleration includes at least acceleration in a horizontal direction. The walking state determining part 11a derives the moving velocity of the mobile terminal 10 by executing arithmetic processing such as integration to the acceleration of a horizontal direction obtained from the acceleration sensor.

Then, the walking state determining part 11a determines whether the moving velocity of the mobile terminal 10 substantially corresponds to a human walking speed. The moving velocity of the mobile terminal 10 is, in other words, user's moving velocity. That is, through the determination whether the derived moving velocity of the mobile terminal 10 substantially corresponds to human moving velocity, the walking state determining part 11a can determine whether the user is moving at a walking speed (that is, whether the user is walking). Here, the human walking speed is, for example, from 2 km/h to 6 km/h.

In the case where the user is not moving at the walking speed (No at the step S601), the walking state determining part 11a determines that the user is not in the while-watching walking state (step S609), and then turns off a while-watching walking determination flag (step S610). Then, the mobile terminal 10 ends the danger notifying processing. Here, the while-watching walking determination flag is on (the flag is set) while the user is in the while-watching walking state, and off (the flag is deleted) while the user is not in the while-watching walking state.

On the other hand, when the user is moving at the walking speed (Yes at the step S601), the walking state determining part 11a determines whether the screen is on (step S602). Even while the mobile terminal 10 is in an activated state and the user is moving at the walking speed, the user is walking but not while watching the screen when the screen light is off. Therefore, the walking state determining part 11a determines whether the screen light is on.

When the screen is not on (No at the step S602), the walking state determining part 11a determines that the user is not in the while-watching walking state (step S609), and turns off the while-watching walking determination flag (step S610). Then, the mobile terminal 10 ends the danger notifying processing.

On the other hand, when the screen is on (Yes at the step S602), the walking state determining part 11a determines whether user's face is toward the screen (step S603). When the walking state determining processing is started, the first photographing part 14 starts and periodically captures images. As the first photographing part 14 is a so-called inward camera as indicated above, while the user is watching the screen, user's face is photographed.

The walking state determining part 11a recognizes a face included in an image captured by the first photographing part 14 by use of a face recognition algorithm or the like, and a face direction. The walking state determining part 11a can recognize the face direction, for example, by extracting face data out of the image captured by the first photographing part 14 based on the relative position and sizes of face parts or others.

The walking state determining part 11a determines based on the recognition result whether user's face is toward the screen. The walking state determining part 11a determines that user's face is toward the screen when the recognized face direction is toward the screen.

When user's face is not toward the screen (No at the step S603), the walking state determining part 11a determines that the user is not in the while-watching walking state (step S609), and turns off the while-watching walking determination flag (step S610). Then, the mobile terminal 10 ends the danger notifying processing.

When user's face is toward the screen (Yes at the step S603), the walking state determining part 11a determines whether user's visual line is toward the screen (step S604). Even while user's face is toward the screen, the user is walking but not while watching the mobile terminal 10 while user's visual line is not toward the screen. Thus, the walking state determining part 11a determines whether user's visual line is toward the screen.

The walking state determining part 11a can use a visual line recognition algorithm or the like to recognize as the direction of a visual line the extension line connecting the center position of user's iris and the center position of user's eyeball in an image captured by the first photographing part 14. Concretely, the walking state determining part 11a extracts an image corresponding to user's eye out of an image captured by the first photographing part 14, and further extracts an iris out of the image showing eyes. Then, the walking state determining part 11a recognizes the direction of the visual line by detecting the center position of the iris, and driving the line connecting the center position of the iris and the center position of the eyeball. The walking state determining part 11a determines whether user's visual line is toward the screen based on the recognition result. The walking state determining part 11a determines that user's visual line is toward the screen when the recognized direction of the visual line is toward the screen.

One of the step S603 and the step S604 may be executed. Executing just one of the steps is enough to roughly determine whether the user is watching the screen. However, executing the both steps as in the embodiment provides more accurate determination on whether the user is watching the screen.

Next, while user's visual line is not toward the screen (No at the step S604), the walking state determining part 11a determines that the user is not in the while-watching walking state (step S609), and turns off the while-watching walking determination flag (step S610). Then, the mobile terminal 10 ends the danger notifying processing.

While user's visual line is toward the screen (Yes at the step S604), the walking state determining part 11a determines whether the time during which user's visual line is toward the screen has continued for a prescribed period of time (step S605). Even while the user is walking while watching the mobile terminal 10, it is not said that the user is in the dangerous while-watching walking state when the user moves his or her visual line from the screen in a short time. Accordingly, criteria for determining of the while-watching walking state include the item that the time during which a user is watching a screen has continued for a prescribed period of time or longer.

When the walking state determining processing is started, the time measuring part 16 is activated. The time measuring part 16 measures the time from when it is determined that user's visual line is toward the screen to when it is determined that user's visual line is not toward the screen. The walking state determining part 11a obtains the time information from the time measuring part 16, and determines whether a prescribed period of time has elapsed since the measurement start. The case where a prescribed period of time has elapsed is, in other words, the case where the time during which the user is watching the screen has continued for a prescribed period of time.

When the time during which the user is watching the screen has not continued for a prescribed period of time (No at the step S605), the walking state determining part 11a determines that the user is not in the while-watching walking state (step S609), and turns off the while-watching walking determination flag (step S610). Then, the mobile terminal 10 ends the danger notifying processing.

When the time during which the user is watching the screen has continued for a prescribed period of time (Yes at the step S605), the walking state determining part 11a determines whether a background is changing (step S606). The background is the scene photographed by the second photographing part 15. When the walking state determining processing is started, the second photographing part 15 starts and periodically captures images. Since the second photographing part 15 is an outward camera as described above, the second photographing part 15 photographs the ground where the user is located while the user holds the mobile terminal 10 substantially horizontally.

While the user is walking, the background is changing accordingly. Thus, the walking state determining part 11a determines whether the background is changing. Whether the background is changing may be determined based on the determination whether feature points on captured images (for example, luminance distribution information) move, expand or shrink. Therefore, the walking state determining part 11a determines whether there is any change in the background among the images captured periodically and successively.

While the user is on a train or a vehicle such as a car that is moving at a low speed, in each of the steps from the step S601 to the step S605, the determination that the user is in the while-watching walking state may be made. However, the background is not changing while the user is on a train, a car or other vehicle. Thus, using the determining criteria including the determination whether the background is changing as indicated in the embodiment allows accurate distinction of the walking state from the moving state on a vehicle.

While the background is not changing (No at the step S606), the walking state determining part 11a determines that the user is not in the while-watching walking state (step S609), and turns off the while-watching walking determination flag (step S610). Then, the mobile terminal 10 ends the danger notifying processing.

While the background is changing (Yes at the step S606), the walking state determining part 11a determines that the user is in the while-watching walking state (step S607), and turns on the while-watching walking determination flag (step S608). That is, the walking state determining part 11a determines that the user is in the while-watching walking state when all of the criteria from the step S601 to the step S606 are satisfied.

Whether the user is in the while-watching walking state may be determined based on the determination on the steps from the step S601 to the step S603. However, the while-watching walking state may be accurately determined based on the entire determination criteria including the change in background and others, in addition to the criteria concerning the moving velocity, user's face direction and the direction of user's visual line as in the embodiment. Then, the mobile terminal 10 advances the processing to the danger determining processing (step S502).

Figure 7:
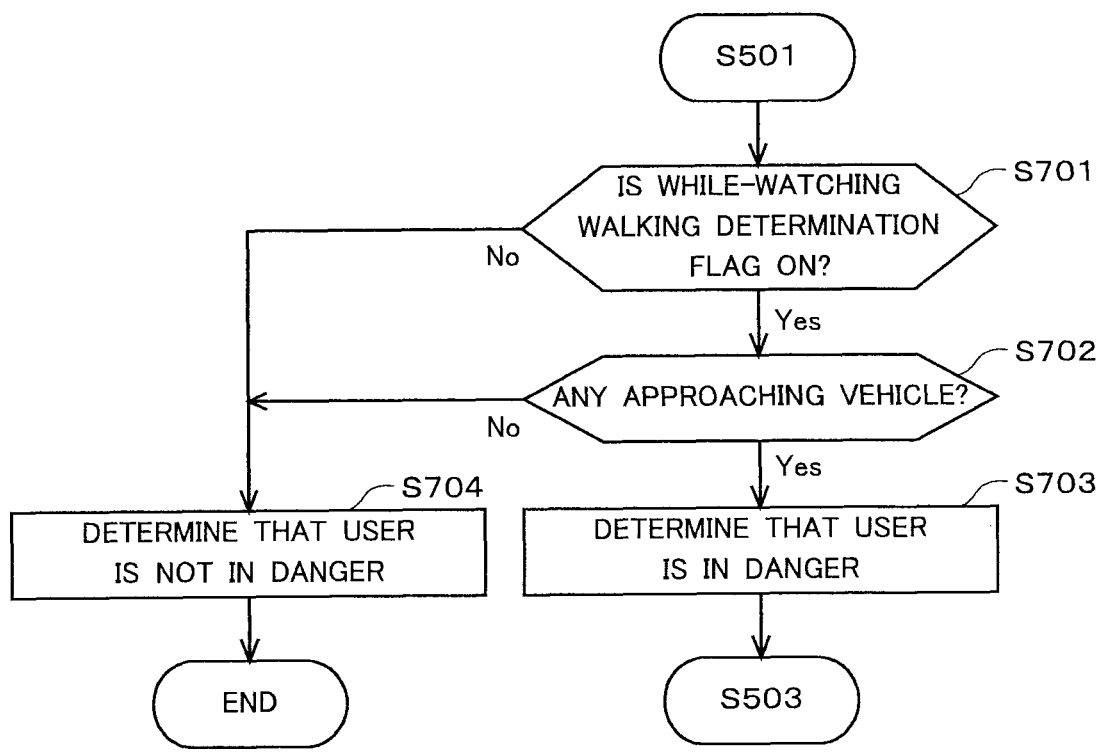
FIG. 7 shows a flowchart of danger determining processing.

Next, the danger determining processing (step S502) is detailed. FIG. 7 shows the flowchart of the danger determining processing.

First, the danger determining part 11b determines whether the while-watching walking determination flag is on (step S701). If the danger determining processing is executed only when it is determined that the user is in the while-watching walking state, this step can be omitted. However, since it is possible to concurrently execute the walking state determining processing and the danger determining processing, the while-watching walking determination flag may be off when the danger determining processing starts in some processing execution timings. Thus, in the danger determining processing, it is checked that the while-watching walking determination flag is on.

When the while-watching walking determination flag is off (No at the step S701), the danger determining part 11b determines that the user is not in danger (step S704), and ends the danger notifying processing.

When the while-watching walking determination flag is on (Yes at the step S701), the danger determining part 11b determines whether any vehicle is approaching (step S702). Even while the user is in the while-watching walking state, the user may not be in danger, for example, in the case where there is no vehicle running around the user. Thus, the danger determining part 11b determines whether the user is in danger in consideration of user's surroundings, for example, the existence of any approaching vehicle.

Here, the method to determine whether any vehicle is approaching is described. The vehicle 30 is running while outputting ultrasonic waves that have a prescribed frequency from the ultrasonic wave output part 32. The prescribed frequency can be any frequency that the sound collector 19 of the mobile terminal 10 can collect, for example, any frequency from 20 kHz to 40 kHz.

When the sound collector 19 of the mobile terminal 10 receives the ultrasonic waves, the danger determining part 11b converts the received ultrasonic waves to frequency components by FFT (Fast Fourier Transform) or other processing. The danger determining part 11b periodically executes this processing to determine whether any vehicle is approaching based on the change in the frequency. That is, assuming that the frequency of the ultrasonic waves output from the ultrasonic wave output part 32 of the vehicle 30 is constant, the frequency of the ultrasonic waves received by the mobile terminal 10 gradually increases as a vehicle is approaching (due to Doppler effect).

Accordingly, the danger determining part 11b determines that a vehicle is approaching when the frequency of the ultrasonic waves changes toward a high frequency side more than a prescribed number of times repeatedly. The purpose of setting a prescribed number of times as a condition is to accurately extract an approaching vehicle, while excluding an inapplicable vehicle, for example, a vehicle once approaching but going away in a short time. The number of times just enough to make accurate determination of approaching may be appropriately set, for example, three times, five times, and ten times.

When there is no approaching vehicle in the step S702 (No at the step S702), the danger determining part 11b determines that the user is not in danger (step S704), and ends the danger notifying processing.

When a vehicle is approaching (Yes at the step S702), the danger determining part 11b determines that the user is in danger (step S703). As above, considering not only user's while-watching walking state but also user's surroundings (especially an approaching vehicle) allows the extraction of the case where the user is in danger. Then, the mobile terminal 10 advances the processing to the danger degree determining processing (step S503).

Figure 8:
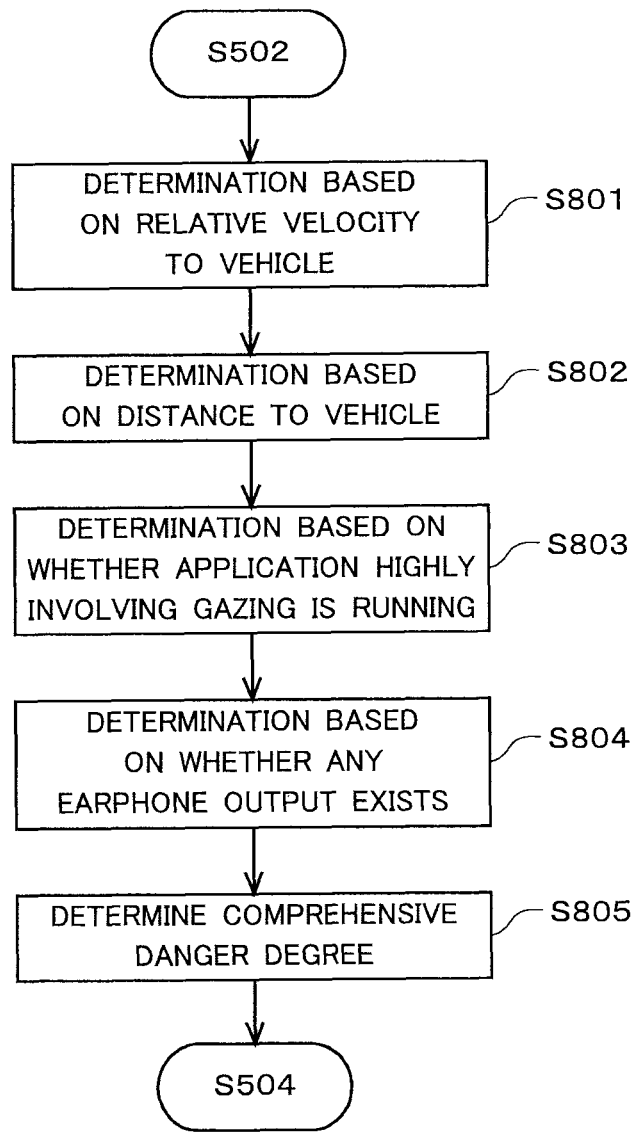
FIG. 8 shows a flowchart of danger degree determining processing.

Next, the danger degree determining processing (step S503) is detailed. FIG. 8 shows the flowchart of the danger degree determining processing.

First, the danger degree determining part 11c determines a danger degree based on relative velocity to the vehicle 30 (step S801). The relative velocity to the vehicle 30 is derived based on the change in frequency of the ultrasonic waves collected from the vehicle 30. In the embodiment, the danger degree is determined in a manner where the range of the relative velocity is divided into, for example, two: when the relative velocity is larger, the danger degree is higher; and the relative velocity is smaller, the danger degree is lower. How to distinguish between larger velocity and smaller velocity can be appropriately set. In an example, relative velocity of 20 km/h or higher corresponds to larger velocity; and relative velocity of less than 20 km/h corresponds to smaller velocity.

Then, the danger degree determining part 11c determines the danger degree based on a distance to the vehicle 30 (step S802). In an example case where the vehicle 30 is constituted so as to superimpose the location information of the vehicle 30 itself on ultrasonic waves for output, the mobile terminal 10 can derive the distance to the vehicle 30 by comparing the received location information and its own location information. In this case, the danger degree determining part 11c determines the danger degree in a manner where the range of the relative distance is divided into, for example, two: when the distance is shorter, the danger degree is higher; and when the distance is longer, the danger degree is lower. How to distinguish between shorter distances and longer distance can be appropriately set. In an example, a distance shorter than 50 m corresponds to a shorter distance; a distance of 50 m or longer corresponds to a longer distance.

Then, the danger degree determining part 11c determines the danger degree based on whether application highly involving gazing is running or not (step S803). The application highly involving gazing is the application at which the user highly possibly stares in the screen, for example, video playback application or game application. The danger degree determining part 11c determines whether the application currently used corresponds to the application highly involving gazing based on the category (e.g., video, game) assigned to each application, to determine the danger degree in a manner where: when the application corresponds to the application highly involving gazing, the danger degree is high; and when the application corresponds to the application not-involving gazing, the danger degree is low.

Next, the danger degree determining part 11c determines the danger degree based on whether there is any earphone output (step S804). The danger degree determining part 11c determines whether any sound is output from an earphone output terminal included in the sound output part 18, to determine the danger degree in a manner where: when any sound is output, the danger degree is high; and when no sound is output, the danger degree is low. The case where any sound is output from an earphone output terminal is when the user is listening to the music, video sound or others by use of an earphone, not listening to the sound of surroundings. Thus, sine the user can not listen to any approaching sound of a vehicle or others and accordingly the user hardly realizes an approaching vehicle, the danger degree is set to be higher.

The danger degree determining part 11c determines, based on the danger degrees determined by these steps of the determination processing, a comprehensive danger degree to select the details notifying the user of danger (hereinafter, referred to as "comprehensive danger degree") (step S805). In an example in the embodiment, when two or more items are determined as high danger degree in the steps of the processing, the comprehensive danger degree is set to be high; when one item is determined as high danger degree, the comprehensive danger degree is set to be middle; and when non is determined as high danger degree, the comprehensive danger degree is set to be low.

However, the method for determining the comprehensive danger degree is not limited to this. The range of the comprehensive danger degree may be divided into three or more, or the number of the items as high danger degree for classifying the comprehensive danger degree may be changed. Or, the comprehensive danger degree is determined only based on a specific danger degree. The comprehensive danger degree can be appropriately set in accordance with the details of the danger degrees determined in the respective steps or with their combination. Based on a table showing the relation between various danger degrees and the comprehensive danger degree previously stored in the memory 21, the danger degree determining part 11c may determine the comprehensive danger degree. As above, the danger degree to select the details for notifying the user of danger is determined. Then, the mobile terminal 10 advances the processing to the notification processing (step S504).

Figure 9:
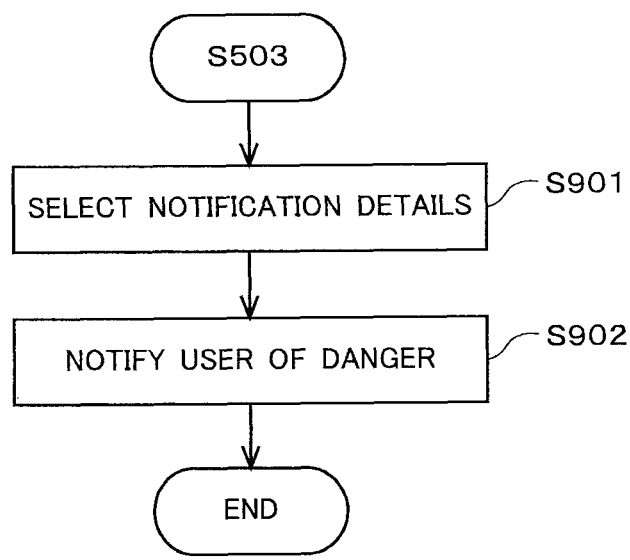
FIG. 9 shows a flowchart of notification processing.

Next, the notification processing (step S504) is detailed. FIG. 9 shows the flowchart of the notification processing.

First, the notification controller 11d selects notification details based on the comprehensive danger degree (step S901). The notification details are the types and details of a message, an icon, vibration, a voice and others, to notify the user that he or she is in danger. The notification controller 11d selects one type or plural types out of these various types in accordance with the comprehensive danger degree. In an example, when the comprehensive danger degree is high, the notification controller 11d selects a message, vibration and a voice; when the comprehensive danger degree is middle, the notification controller 11d selects an icon and vibration; and when the comprehensive danger degree is low, the notification controller 11d selects only an icon.

Then the notification controller 11d notifies the user that the user is in danger based on the selected notification details (step S902). When using a message for notifying the user of danger, the notification controller 11d displays an interruption pop-up message on the screen displayed at the time in the display 13. When using an icon for notifying the user of danger, the notification controller 11d displays an icon at a prescribed position such as the upper part of the screen of the display 13.

Figure 10:
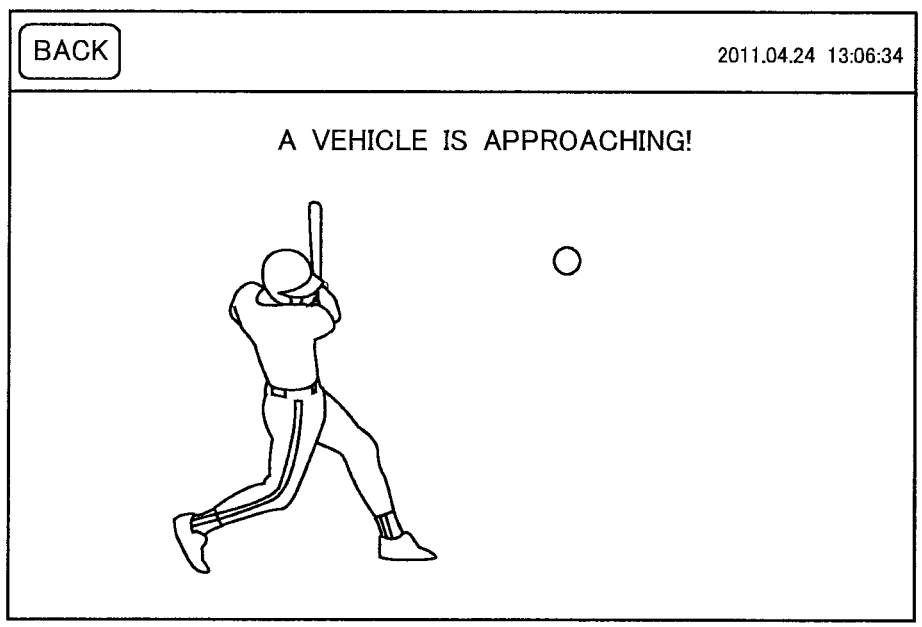
FIG. 10 shows an example of a display screen.
Figure 11:
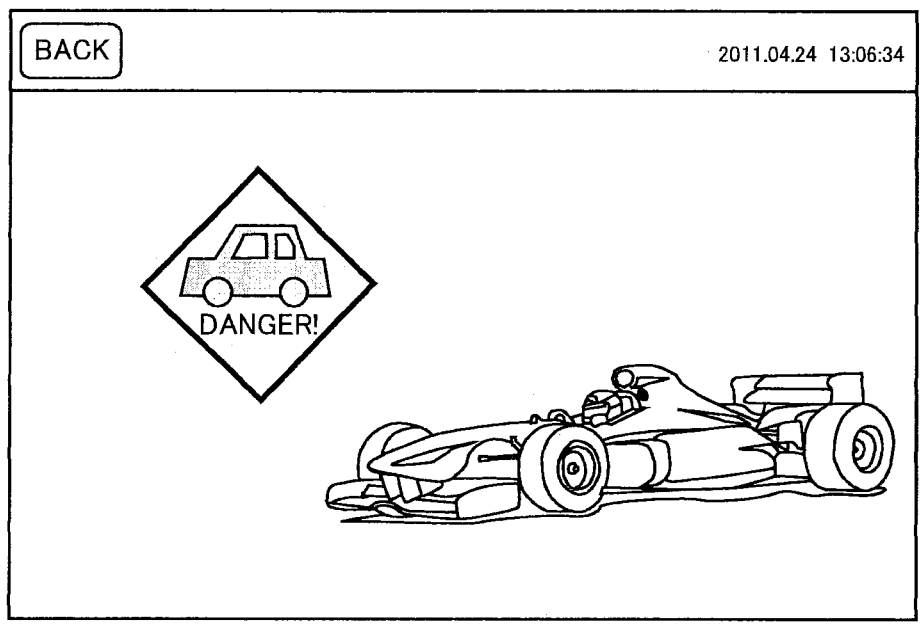
FIG. 11 shows another example of a display screen.

Here is an example of a message displayed on the screen by the notification controller 11d for explanation. Each of FIG. 10 and FIG. 11 shows an example of the screen for notifying the user of danger. As shown in FIG. 10, when using a message for notifying the user of danger, the notification controller 11d displays an interruption message on the screen. When using an icon for notifying the user of danger, as shown in FIG. 11, the notification controller 11d displays an icon at a prescribed position of the screen.

When using vibration for notifying the user of danger, the notification controller 11d vibrates the mobile terminal 10 for a prescribed period of time. When using a voice for notifying the user of danger, the notification controller 11d outputs a voice telling the danger from the sound output part 18. In the case where the user is using an earphone, the notification controller 11d outputs an interruption voice from an earphone output terminal over the sound output at the time. When the user is not using an earphone, the notification controller 11d outputs the voice from a speaker. The notification controller 11*d* outputs for notification a voice such as "a vehicle is approaching" from an earphone output terminal or a speaker. This notifies the user of danger in accordance with a danger degree.

As above, the mobile terminal 10 determines whether the user is in danger or not in consideration of the status of surroundings and the use status on the mobile terminal 10 while the user is in the while-watching walking state. Then, the mobile terminal 10 determines whether notifying the user of danger is required and changes the notification details in accordance with the determination result. As above, the processing ensures to determine that the user is in the while-watching walking state and that the user is in danger, and to notify the user of the details in accordance with user's danger degree.

<1-6. Processing of Danger Notifying System>

The invention can also notify a driver on the vehicle 30 of danger in addition to notifying the user of the mobile terminal 10 of danger. The description hereafter is about the danger notification given to the driver on the vehicle 30.

On the danger notifying system 100, the mobile terminal 10 transmits to the center 40 the location information of the mobile terminal 10 when the user is in danger. Concretely, the mobile terminal 10, when it is determined that the user is in danger in the danger determining processing, transmits the determination result and the location information (these are called "danger information") to the center 40. Then, the center 40 collects the danger information and transmits the collected danger information to the vehicle 30 running in the periphery of the mobile terminal 10 that is in danger.

The vehicle 30, when receiving the danger information from the center 40, displays the danger information on the display 36, that is, displays at an applicable location on a map the indication of existence of the mobile terminal 10 that is in danger. This notifies the driver on the vehicle 30 about existence of a pedestrian with declined concentration to surroundings, so as to make the driver pay attention.

2. Second Embodiment

Next, the second embodiment is described. In the configuration of the first embodiment, danger is determined in consideration of whether there is any vehicle approaching in the periphery of a user. In another configuration, danger is determined in consideration of an obstacle other than a vehicle. In the second embodiment, the configuration where danger is determined in consideration of an obstacle other than a vehicle is described.

<2-1. Outline of System>

A danger notifying system of the second embodiment has the same configuration as the danger notifying system 100 shown in FIG. 1. That is, the configuration of a mobile terminal 10, a vehicle 30 and a center 40 of the second embodiment are the same as those of the first embodiment. In the second embodiment, danger determining processing and danger degree determining processing out of the danger notifying processing by the mobile terminal 10 are different from those of the first embodiment. Thus, hereafter the different points from the first embodiment regarding the danger notifying processing are mainly described.

<2-2. Danger Notifying Processing>

The danger notifying processing of the second embodiment is described. The outline of the danger notifying processing of the second embodiment is the same as the one of the first embodiment. That is, the mobile terminal 10 executes the danger determining processing (walking state determining processing, danger determining processing, danger degree determining processing and notification processing) shown in FIG. 5. In the danger notifying processing of the embodiment, the walking state determining processing and the notification processing are the same as the ones of the first embodiment; while the danger determining processing and the danger degree determining processing are different from the ones of the first embodiment.

Figure 12:
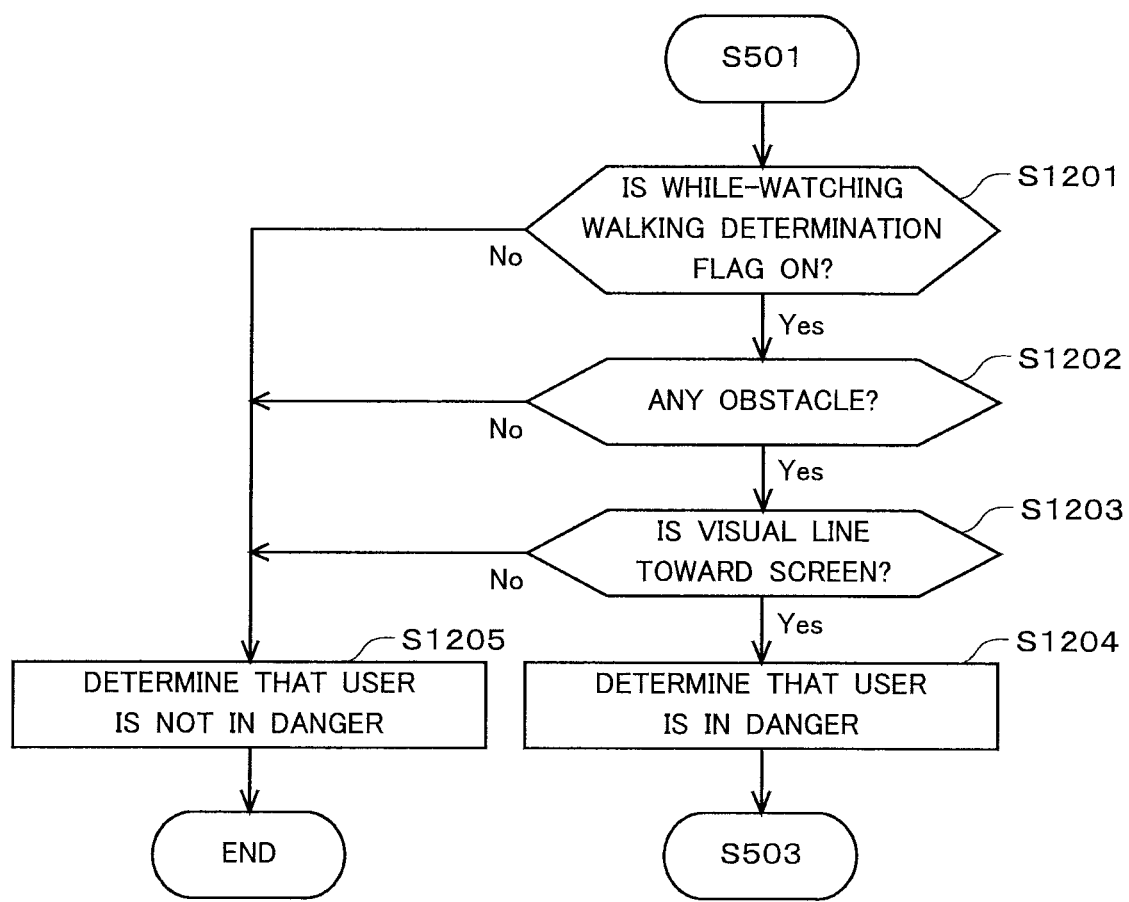
FIG. 12 shows another flowchart of danger determining processing.

First, the danger determining processing of the embodiment is described. FIG. 12 shows the flowchart of the danger determining processing.

First, a danger determining part 11*b* determines whether a while-watching walking determination flag is on (step S1201). This is the same step as the step S701 described above. When the while-watching walking determination flag is off (No at the step S1201), the danger determining part 11*b* determines that a user is not in danger (step S1205), and ends the danger notifying processing to be executed by the mobile terminal 10. This is also the same step as the step S704 described above.

When the while-watching walking determination flag is on (Yes at the step S1201), the danger determining part 11*b* determines whether there is any obstacle (step S1202). The user may, even while walking on a pavement, have an accident with an obstacle on the pavement. Thus, the danger determining part 11*b* determines whether the user is in danger in consideration of the obstacle by determining the existence of any obstacle with which the user may have an accident.

Here is the description about the method for determining the existence of any obstacle. The mobile terminal 10 keeps a second photographing part 15 activated even during execution of the danger determining processing so as to periodically capture images. The danger determining part 11*b* determines the existence of an obstacle based on the determination whether any obstacle is included in shot images. The obstacle is an object with which the user may have an accident, for example, a telegraph pole and a baby buggy, further including a place where the user may fall, for example, the end of station's platform.

In an example, a memory 21 stores the patterns of obstacles such as telegraph poles and others in advance, and the danger determining part 11*b* compares the object or others extracted by image recognition with the stored patterns of obstacles to determine whether the object is an obstacle in accordance with coincidence. The danger determining part 11*b*, when determining that the object is an obstacle, determines that there is an obstacle.

At the step S1202, when there is no obstacle (No at the step S1202), the danger determining part 11*b* determines that the user is not in danger (step S1205), and ends the danger notifying processing.

When there is an obstacle (Yes at the step S1202), the danger determining part 11*b* determines whether user's visual line is toward a screen (step S1203). When user's visual line is toward a screen, it is highly possible that the user is not aware of the obstacle. Thus, the determination is included in the conditions for determining danger state. Whether user's visual line is toward the screen is determined by the same method as the step S604 described above.

When user's visual line is not toward the screen (No at the step S1203), the danger determining part 11*b* determines that the user is not in danger (step S1205), and ends the danger notifying processing. When user's visual line is toward the screen (Yes at the step S1203), the danger determining part 11*b* determines that the user is in danger (step S1204), and advances the processing to the danger degree determining processing (step S503).

The danger determining processing of the invention may be constituted so as to execute the both of the processing for determining the existence of any obstacle described in the embodiment, and the processing for determining whether any vehicle is approaching described in the first embodiment (step S702), and to determine that the user is in danger when one of the determining conditions is satisfied.

Figure 13:
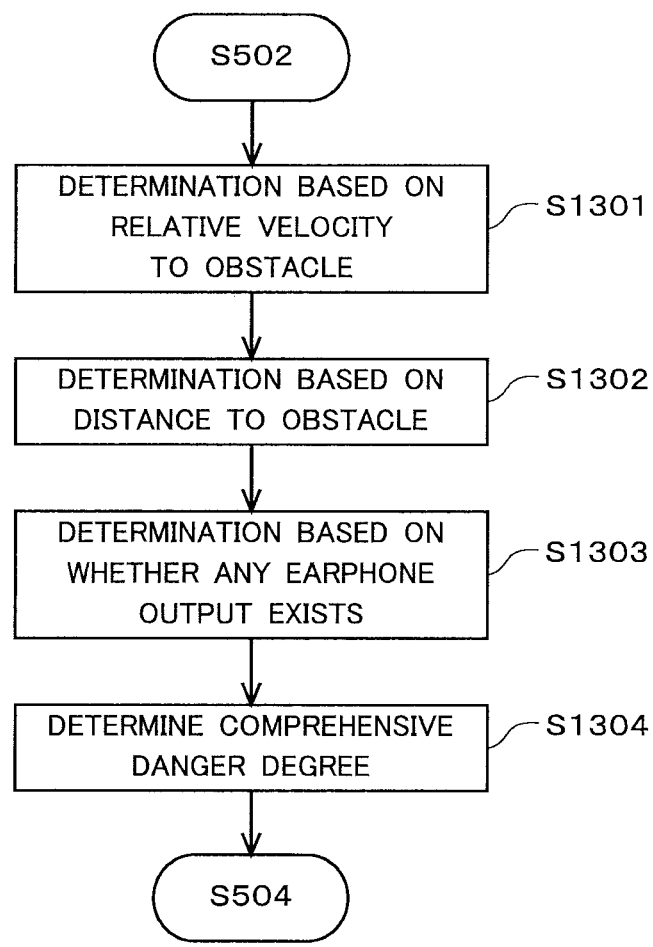
FIG. 13 shows another flowchart of danger degree determining processing.

Next, the danger degree determining processing is described. FIG. 13 shows the flowchart of the danger degree determining processing of the embodiment.

First, a danger degree determining part 11c determines a danger degree based on relative velocity to the obstacle (step S1301). The relative velocity to the obstacle is derived based on the moving velocity of the mobile terminal 10 when the obstacle is a static object such as a telegraph pole. When the obstacle is a moving object such as a baby buggy, the danger degree determining part 11c derives the relative velocity by use of photographing timing and the distance to the obstacle extracted by image recognition. Then, the danger degree determining part 11c divides the range of the danger degree, for example, into two in accordance with the relative velocity. When the relative velocity to the obstacle cannot be derived, this step in the processing may be omitted.

Next, the danger degree determining part 11c determines the danger degree based on the distance to the obstacle (step S1302). The distance to the obstacle is derived by use of the position of the obstacle extracted by image recognition. Then, the danger degree determining part 11c divides the range of the danger degree, for example into two in accordance with the derived distance. When the distance to the obstacle cannot be derived, this step in the processing may be omitted.

Next, the danger degree determining part 11c determines the danger degree based on presence or absence of earphone output (step S1303). This may be made by the same step as the step S804 described above.

Next, the danger degree determining part 11c determines a comprehensive danger degree to select the details for notifying the user of danger based on the danger degrees determined by these respective steps (step S1304). This determination may be also made by the same step as the step S805 described above. Then, the processing moves on to the notification processing (step S504). In the embodiment, in the case where an obstacle is detected and it is determined that the user is in danger, one fixed danger degree may be adopted without determining the danger degree.

As above, in the case where the user is in the while-watching walking state, and in danger with possibility of having an accident with an obstacle other than a vehicle, the processing ensures to determine that the user is in the while-watching walking state and that the user is in danger, and to notify the user of the details in accordance with user's danger degree.

3. Modification

The embodiments of the invention have been described so far. However, the invention is not limited to the embodiments described above, and may provide various modifications. Hereafter, these modifications are described. All embodiments including the embodiments described above and the embodiments to be described below can be arbitrarily combined with others.

<3-1. Walking State Determination>

First, modifications of the walking state determining processing are described. In each of the embodiments described above, the mobile terminal 10 is constituted so as to activate the first photographing part 14 and the second photographing part 15 to photograph user's face and a background at constant intervals of time, when the walking state determining processing starts. However, a mobile terminal may be constituted so as to photograph them at variable intervals of time depending on user's moving velocity.

In an example, a mobile terminal 10, when determining that a user is moving substantially at a fast walking speed (e.g., 6 km/h, or 4 steps/sec), shortens the interval of time (e.g., interval of 500 ms). When determining that a user is moving substantially at a normal walking speed (e.g., 4 km/h, or 2 steps/sec), the mobile terminal 10 lengthens the interval of time (e.g., interval of 1000 ms). This allows the mobile terminal 10 to capture images at a constant moving distance, which prevents useless consumption of a battery while making accurate determination of a walking state.

In each of the embodiments described above, the mobile terminal 10 is constituted so as to derive the moving velocity of the mobile terminal 10 by use of the output values by the acceleration sensor 12. However, a mobile terminal may be constituted so as to derive the moving velocity by use of the location information obtained by a location information acquisition part 17. In this case, the mobile terminal 10 can derive the moving distance based on a prescribed period of time, by obtaining the location information at a prescribed interval of time. Thus, the mobile terminal 10 can derive a moving velocity based on the period of time and the moving distance. Using a technical method such as IMES (Indoor MEssaging System) for obtaining indoor-location information as the location information acquisition part 17 allows the determination of user's moving velocity even when the user is moving indoor.

In each of the embodiments described above, a while-watching walking state is determined based on the determination condition where user's face and visual line are toward the screen for a prescribed period of time. However, a configuration is not limited to this. In an example, a user may, while using map application on a mobile terminal 10, look around not only at a screen of the mobile terminal 10. Thus, while map application is in a running state, walking state determining processing may be executed without the steps for determining whether user's face and visual line are toward the screen for a prescribed period of time (step S603 to step S605). That is, when determining that map application is in a running state, a walking state determining part 11a determines that the user is in the while-watching walking state based on the determination that the conditions of the step S601, the step S602 and the step S606 are satisfied.

In each of the embodiments described above, user's moving velocity is derived based on the acceleration obtained from the acceleration sensor 12. When the moving velocity substantially corresponds to human's walking speed, it is determined that the user is walking. However, determination processing is not limited to this. In an example, a mobile terminal 10 converts the acceleration obtained from an acceleration sensor 12 into a frequency component, and derives a period based on the frequency. The mobile terminal 10 stores the determination result of being in the walking state, and the frequency and the period at that time in the state where the determination result, the frequency and the period are associated. This allows the determination that a user is in the walking state when the acceleration of the frequency and the period specific to the user having the mobile terminal 10 is obtained. The determination conditions including these frequency and period in addition to the moving velocity offer more accurate determination that a user is in the walking state. As above, by understanding the frequency and the period corresponding to user's walking state, the mobile terminal 10 can prevent misdetermination of the user being in the walking state, when frequency or a period does not correspond to user's walking state even with pseudo acceleration given to the mobile terminal 10.

<3-2. Danger Determination>

Next, the modification of the danger determining processing is described. In each of the embodiments described above, the ultrasonic waves having a prescribed frequency are output from the vehicle 30, and the danger determining part 11b determines that the vehicle 30 is approaching based on the change in frequency. However, the configuration is not limited to this. In an example, a vehicle 30 may be constituted so as to output ultrasonic waves with constant sound volume, and a danger determining part 11b may be constituted so as to determine that the vehicle 30 is approaching based on the change in the sound volume of ultrasonic waves.

Concretely, in the case where the vehicle 30 outputs ultrasonic waves with constant sound volume, the sound volume of the ultrasonic waves received by the mobile terminal 10 increases as the vehicle 30 is approaching the mobile terminal 10. Accordingly, the danger determining part 11b can determine that the vehicle 30 is approaching when detecting the increase of the sound volume of the ultrasonic waves. In this case, the danger determining part 11b determines that the vehicle 30 is approaching when the sound volume of the ultrasonic waves increases successively more than a prescribed number of times. The reason why the determination requires more than the prescribed number of times is to ensure extraction of the vehicle 30 approaching. The number of times may be appropriately set, for example, three times, five times, and ten times.

Other than the method for determining that the vehicle 30 is approaching when the sound volume increases successively more than a prescribed number of times, the method for setting a threshold value for determining whether the vehicle 30 is approaching may be adopted. In this case, the danger determining part 11b determines that the vehicle 30 is approaching when the sound volume of the ultrasonic waves exceeds the threshold value. This allows the detection of the vehicle 30 approaching within the area where the user may be in danger, excluding the approach from the location far from the mobile terminal 10.

The vehicle 30 may be constituted so as to output ultrasonic waves with variable sound volume in accordance with the velocity of the vehicle 30, not to output ultrasonic waves with constant sound volume. In an example, the vehicle 30 may increase the sound volume of the ultrasonic waves to output as the moving velocity of the vehicle 30 increases. In this case, the mobile terminal 10 can grasp the moving velocity of the vehicle 30 and its approaching based on the sound volume of the received ultrasonic waves.

In addition to the configurations of the embodiments described above, a vehicle 30 may be constituted so as to output the information on the direction indicated by the direction indicator of the vehicle 30 and the location information of the vehicle 30, which are superimposed on ultrasonic waves. In this case, since the mobile terminal 10 can predict the movement of the approaching vehicle 30 based on the direction information and the location information of the vehicle 30, the mobile terminal 10 can notify the user of being in danger with the approaching direction of the vehicle 30.

In addition to the configurations described in the embodiments, the vehicle 30 may be constituted so as to superimpose the ultrasonic waves having constant frequency of human inaudible range on the honk of the vehicle 30. In the case where the vehicle 30 is approaching while honking, the mobile terminal 10 receives both of the ultrasonic waves output from an ultrasonic wave output part 32 and the ultrasonic waves superimposed on the honk. In an example, when a threshold value for determination of approaching is set, the mobile terminal 10 can determine earlier that the vehicle 30 is approaching.

In each of the embodiments described above, the vehicle 30 is constituted so as to constantly output ultrasonic waves. However, the configuration is not limited to this. In the case where any pedestrian never become in danger, for example, the case where there is no pedestrian around a vehicle 30 and the case where there is no possibility of contact with a pedestrian, outputting ultrasonic waves may be stopped. The case where any pedestrian never become in danger is, for example, the case where the vehicle 30 runs on an expressway, the case where the vehicle 30 is parked in a parking area, and the case where the vehicle 30 is stopped at a red signal.

In each of the embodiments described above, the vehicle 30 has the dedicated ultrasonic wave output part 32. However, the configuration is not limited to this. In the case where an ultrasonic wave sensor (e.g. clearance sonar) for obstacle detection is installed on a vehicle 30, the ultrasonic wave sensor may be also used as an ultrasonic wave output part by setting the frequency collectable by a sound collector 19.

In the case where a vehicle 30 is an electric car or a hybrid car, the vehicle 30 is equipped with notification sound generating apparatus that generates a notification sound to notify the surroundings of the vehicle presence. Thus, the notification sound output by the notification sound generating apparatus may be used for determination of the approach of the vehicle 30, instead of the ultrasonic waves output by an ultrasonic wave output part 32. In this case, the vehicle 30 does not require a dedicated ultrasonic wave output part 32.

When receiving the sound having the frequency that corresponds to the notification sound output by the notification sound generating apparatus, a danger determining part 11b determines that the vehicle 30 is approaching based on the frequency of the received notification sound, its sound volume and others. Moreover, with the use of the notification sounds having vehicle-model-specific frequencies, the danger determining part 11b may notify the user of the vehicle model of the approaching vehicle 30 in accordance with the frequency of the received notification sound. Thus, the user can know concretely what vehicle is approaching.

The vehicle 30 is making engine noises and road noises while running. Thus, the engine noises or the road noises may be used for determination of the approach of the vehicle 30 instead of the ultrasonic waves output from the ultrasonic wave output part 32. In this case, the vehicle 30 can determine the approach of every type of a vehicle 30, without installation of the dedicated ultrasonic wave output part 32 or the notification sound generating apparatus for determination of the approach of the vehicle 30.

<3-3. Danger Degree Determination>

Next, the modification of the danger degree determining processing is described. In each of the embodiments described above, the danger degree is determined in accordance with the relative velocity or the distance to the vehicle 30, an obstacle or others, or presence or absence of earphone output. However, the processing is not limited to this. The danger degree may be determined in consideration of other conditions.

In the case of a mobile terminal 10 connecting to a radio LAN access point, the mobile terminal 10 can identify whether the access point is located indoors or at public transportation such as a train. In the case where the mobile terminal 10 is connected to such an access point located indoors or in a train, it is highly possible that a user is not in danger such as of having a contact with a vehicle 30. Accordingly, in the case where the mobile terminal 10 is connected to an access point located indoors or in a train, a danger degree determining part 11*c* may determine that the danger degree is low, and may reflect the determination result into the danger degree determination.

In the case where the mobile terminal 10 or a center 40 has, in advance, the information on the locations where traffic accidents frequently occur, the configuration to determine the danger degree based on the location of the mobile terminal 10 may be adopted. In an example, the danger degree determining part 11*c* compares the location information obtained by a location information acquisition part 17 and the information on the locations where traffic accidents frequently occur. When the mobile terminal 10 is located in the periphery of one of the locations where traffic accidents frequently occur, the danger degree determining part 11*c* determines that the danger degree is high, and reflects the determination result into the danger degree determination.

While the vehicle 30 is honking, it is highly possible that a user is in great danger. Thus, when the mobile terminal 10 receives both of the ultrasonic waves output by an ultrasonic wave output part 32 of the vehicle 30 and the ultrasonic waves in human inaudible range that have been superimposed on a honk, the danger degree determining part 11*c* may determine that the danger degree is high, and may reflect the determination result into the danger degree determination.

In the description above, the danger degree is determined in consideration of the relative velocity or the distance to a vehicle or an obstacle, or in consideration of the use status on the mobile terminal 10 (running application, earphone output, etc.). Other than the processing, the danger degree may be determined in consideration of the duration of the while-watching walking state. In an example, when it is determined that a user is in the while-watching walking state, the danger degree determining part 11*c* may increase the danger degree as the duration becomes longer.

The danger degree may be also determined in consideration of the use frequency of the road on which a user is walking. In an example, the roads on which a user has ever walked are stored in memory, and the danger degree may be determined in accordance with the use frequency. Concretely, since the user naturally knows, to some extent, the danger of the road that the user frequently goes through, it is determined that the danger degree is low. On the other hand, since the user naturally does not know much the danger of the road that the user rarely goes through, it is determined that the danger degree is high. In this case, the danger degree determining part 11*c* determines the danger degree by comparing the road on which the user is walking and the past use frequency.

The danger degree determining part 11*c* may determine a comprehensive danger degree only based on each status described above, or based on the combination of various danger degrees. The danger degree determining part 11*c* may determine the comprehensive danger degree in accordance with arbitrary combination of the various danger degrees determined based on various statuses, or in accordance with individually weighted various danger degrees.

<3-4. Others>

In each of the embodiments described above, when the walking state determining processing starts, the first photographing part 14, the second photographing part 15 and the sound collector 19 of the mobile terminal 10 are activated, and capture various images and collects sound. If a user unconsciously covers any of a first photographing part 14, a second photographing part 15 and a sound collector 19 with his or her hand, it may be impossible to normally execute the walking state determining processing. Therefore, a mobile terminal 10 monitors whether the user covers the first photographing part 14, the second photographing part 15 and the sound collector 19 with his or her hand when the walking state determining processing starts. If the user covers any of them, the mobile terminal 10 may notify the user of the fact so as to make the user change how to hold the mobile terminal 10.

In each of the embodiments described above, various functions are executed by software, especially by CPU processing based on programs. However, some of these functions may be executed by electrical hardware circuits. Contrarily, some of the functions executed through hardware circuits in the above descriptions may be executed through software.

As above, the invention can surely determine that a user is watching a mobile terminal. Moreover, the invention can surely determine that a user is walking because the invention can prevent making misdetermination, even while the user is actually moving on a train or others, not walking. The invention can also surely determine that a user is walking while watching a mobile terminal.

Moreover, the invention can surely determine that a user is in danger, and can also determine user's danger degree if the user is in danger. Then, the invention can notify the user of the applicable details in accordance with the determined danger degree.

While the invention has been shown and described in detail, the foregoing description is in all aspects illustrative and not restrictive. It is therefore understood that numerous other modifications and variations can be devised without departing from the scope of the invention.

What is claimed is:

1. A mobile terminal comprising:
   a display screen;
   a first camera that is installed on a side of the mobile terminal having the display screen;
   a velocity sensor that derives moving velocity of the mobile terminal; and
   a controller configured to
      determine a starting state of the display screen,
      determine a direction of a face of a user based on a shot image obtained from the first camera, and
      determine whether the user is walking while watching the mobile terminal based on the moving velocity, the starting state and the direction of the face of the user.

2. The mobile terminal of claim 1, wherein
   the controller determines a direction of a visual line of the user based on the shot image obtained from the first camera, and
   the controller determines whether the user is walking while watching the mobile terminal based on the moving velocity, the starting state, the direction of the face of the user and the direction of the visual line of the user.

3. The mobile terminal of claim 2, further comprising
   a second camera that is installed on an opposite side of the mobile terminal from the side having the display screen, wherein
   the controller determines whether the user is walking while watching the mobile terminal based on the moving velocity, the starting state, the direction of the face of the user, the direction of the visual line of the user, and a change in a shot image obtained from the second camera.

4. The mobile terminal of claim 1, further comprising
   a second camera that is installed on an opposite side of the mobile terminal from the side having the display screen, wherein
   the controller determines whether the user is walking while watching the mobile terminal based on the moving velocity, the starting state, the direction of the face of the user, and a change in a shot image obtained from the second camera.

5. The mobile terminal of claim 1, wherein
the controller determines that the user is walking while watching the mobile terminal when the direction of the face of the user is toward the display screen.

6. The mobile terminal of claim 5, further comprising
a timer that measures a time during which the direction of the face of the user is toward the display screen, wherein
the controller determines that the user is walking while watching the mobile terminal when the time during which the direction of the face of the user is toward the display screen exceeds a prescribed period of time.

7. The mobile terminal of claim 2, wherein
the controller determines that the user is walking while watching the mobile terminal when the direction of the visual line of the user is toward the display screen.

8. The mobile terminal of claim 7, further comprising
a timer that measures a time during which the direction of the visual line of the user is toward the display screen, wherein
the controller determines that the user is walking while watching the mobile terminal when the time during which the direction of the visual line of the user is toward the display screen exceeds a prescribed period of time.

9. The mobile terminal of claim 1, further comprising:
a sound collector that collects external sound, wherein
the controller determines whether the user is in danger based on a frequency or sound volume of the collected external sound when the user is walking while watching the mobile terminal.

10. The mobile terminal of claim 9, wherein
the collected external sound is sound output by an external vehicle, and the controller determines whether the user is in danger based on a change in the frequency or in the sound volume of the collected external sound.

11. The mobile terminal of claim 10, wherein
the controller determines that the user is in danger when the frequency of the collected external sound changes toward a high frequency side, or when the sound volume of the collected external sound increases.

12. The mobile terminal of claim 9, wherein
the controller determines a danger degree in accordance with an external status of the mobile terminal or a use status on the mobile terminal when the user is in danger.

13. The mobile terminal of claim 12, wherein
the controller determines the danger degree based on relative velocity of the mobile terminal to an external vehicle or a distance from the mobile terminal to the external vehicle.

14. The mobile terminal of claim 12, wherein
the controller determines the danger degree based on a type of an application that runs on the mobile terminal or based on whether there is sound output from a sound output part that is installed in the mobile terminal.

15. The mobile terminal of claim 9, further comprising
a notifying part that, when the user is in danger, performs notification of the danger.

16. The mobile terminal of claim 15, wherein
the notifying part notifies the user that the user is in danger by one or a plurality of: (i) indication of a letter, (ii) indication of a mark, (iii) outputting of sound and (iv) vibration.

17. A danger notifying system that notifies a driver of a vehicle that a user of a mobile terminal is in danger, the system comprising the mobile terminal and the vehicle, wherein
the mobile terminal includes is the mobile terminal of claim 1:
wherein the controller of the mobile terminal further determines whether the user is in danger when the user is walking while watching the mobile terminal; the mobile terminal further comprising:
a location information receiver that obtains location information of the mobile terminal; and
a transmitter that transmits the location information of the mobile terminal to the vehicle when the user is in danger, and
the vehicle includes:
a display that displays the location information obtained from the mobile terminal.

* * * * *